(No Model.)

E. LAWSON.
SEWER AND WATER TRAP.

No. 274,204. Patented Mar. 20, 1883.

WITNESSES:
Edwin H. Risley
Richard Evans.

INVENTOR.
Edward Lawson
By Edwin H. Risley
Atty

UNITED STATES PATENT OFFICE.

EDWARD LAWSON, OF UTICA, NEW YORK.

SEWER AND WATER TRAP.

SPECIFICATION forming part of Letters Patent No. 274,204, dated March 20, 1883.

Application filed September 30, 1882. (No model.)

*To all whom it may concern:*

Be it known that I, EDWARD LAWSON, of the city of Utica, in the county of Oneida and State of New York, have invented a new and useful Invention in Sewer and Water Traps, which improvement is fully set forth in the following specification and accompanying drawings.

Figure 1:
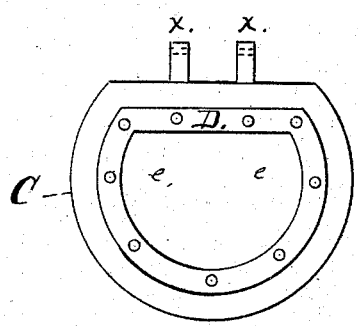
Figure 2:
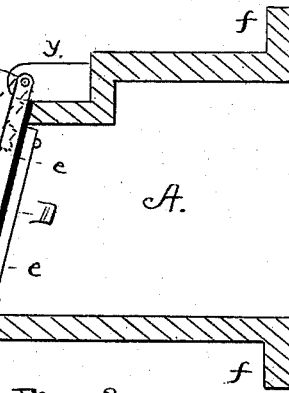
Figure 3:
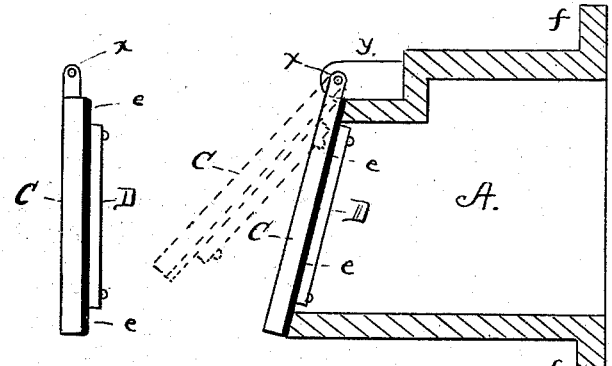
Figure 4:
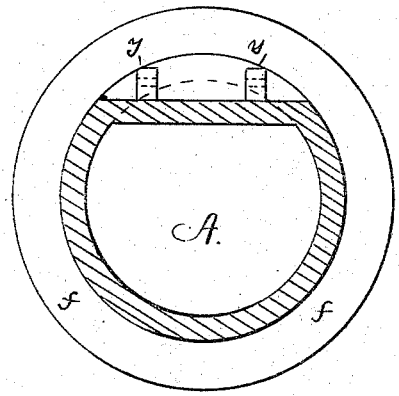
Figure 5:
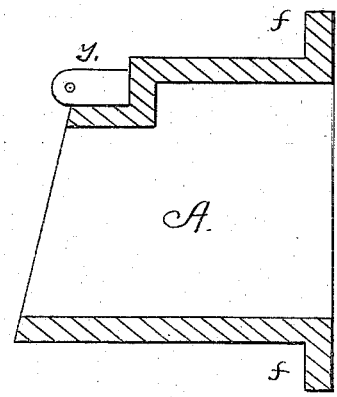

In the accompanying drawings, Figure 1 represents an inside view of the gravity-gate and packing. Fig. 2 represents a side view of the gate and packing. Fig. 3 represents a view of the tube of the trap and gate attached, and the dotted lines represent gate partly open. Fig. 4 represents an end section of the trap with flange. Fig. 5 represents a side section of the trap and hinges attached.

The object of my invention is to furnish a device by which sewer-gases, water, or sewage may be prevented from backing up from the main into houses and buildings, and that will allow water and sewage to pass freely through the trap into the main.

My trap is constructed of materials capable of being cast or pressed in molds or dies; and it consists of a tube from one to three inches long, of sufficient size to fill the inside of the sewer or drain pipe used, with a flange on one end of sufficient size to fit into the bell or cup end of the sewer or drain pipe used, and of sufficient thickness to hold the trap securely in place when the pipes are jointed. On the opposite end of the trap the tube is depressed, so as to give room for lugs or hinge projections to be formed on the same line as the wall of the tube. The end of the tube is beveled to afford an incline bearing upon which the gravity-gate rests. A gate is hinged to the end of the trap, which opens out by the pressure of the contents of the sewer, and closes by its own weight when contents have passed the gate. The inside of the gate is packed with rubber or other material suitable for use, held in place by a metal band riveted to the gate. The tube is slightly tapering from the flange to the opposite end, so as to be easily inserted in the sewer or drain pipe. The trap thus arranged is inserted in the bell or cup end of an ordinary sewer or drain pipe until the flange strikes the shoulder of the pipe, and then the small end of the sewer or drain pipe is inserted in the bell end of the sewer-pipe and the joint secured by cement, thus making a continuous line of sewer-pipe.

In the drawings similar letters refer to similar parts throughout the several views.

Having described the nature and construction of my invention and discovery, I will proceed to described it by reference to the accompanying drawings, in which—

A is the tube of the trap; C, the gate; $e\,e$, the packing on the inside of the gate; D, the metal band to hold the packing in place on the gate; $f\,f$, the flange on the end of the tube; $x\,x$, the lugs or hinges on the gate; $y\,y$, corresponding lugs or hinges, with the depression on the end of the tube, to which the gate is hinged so as to open in the direction of the flow.

I am aware that drain-pipes have been heretofore provided with gates hinged on the end of a length of drain or sewer pipe for the general purposes of the gate in my invention; but so far as I am aware the section of the pipe to which the gate has been applied has been only adapted to connect two lines of pipes at different levels, the gate opening toward the lower level, the pipe, when connected, to form a continuous line of drain or sewer pipe.

I am also aware that gates hinged to short bands have been provided, one end of which is beveled to afford an incline bearing, upon which the gate rests, which opens outward by pressure from within and closes when the contents of the pipe is discharged, for the general purposes of the gate in my invention; but so far as I am aware the gate and band are only adapted to use in connection and combination with a section of sewer-pipe constructed with a man-hole and air-chamber, and other combinations not involved in my invention. I do not, however, make broad claim to the gravity-gate; but What I do claim as my invention, and desire to secure by Letters Patent, is—

A short tube, A, having flange $f\,f$, and provided with lugs or hinges $y\,y$, in combination with gate C, having hinges $x\,x$, substantially as set out, as and for the purposes specified.

EDWARD LAWSON.

Witnesses:
C. H. EVANS,
EDWIN H. RISLEY.